J. G. McKOWN.
SHADE FOR AUTOMOBILE WIND SHIELDS.
APPLICATION FILED NOV. 27, 1914.
1,176,582.
Patented Mar. 21, 1916.
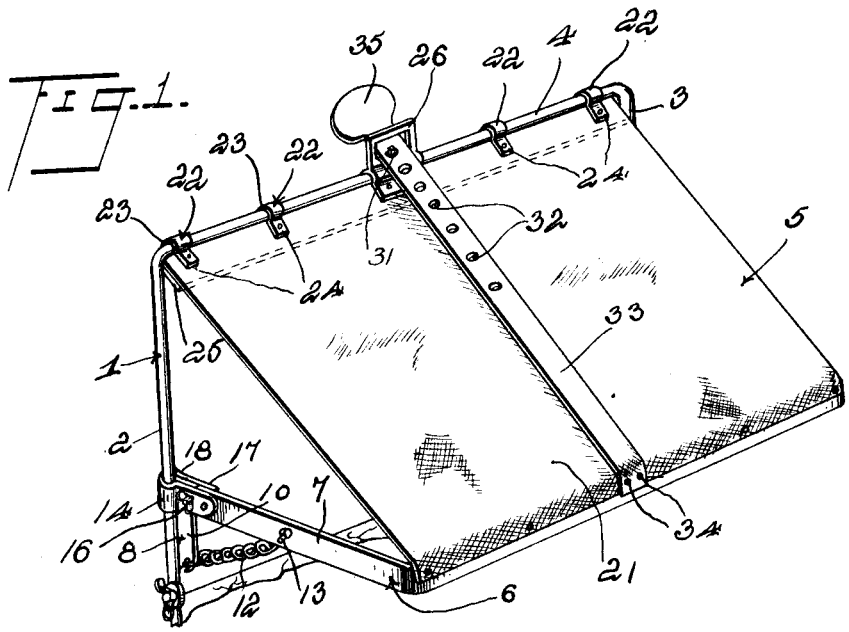
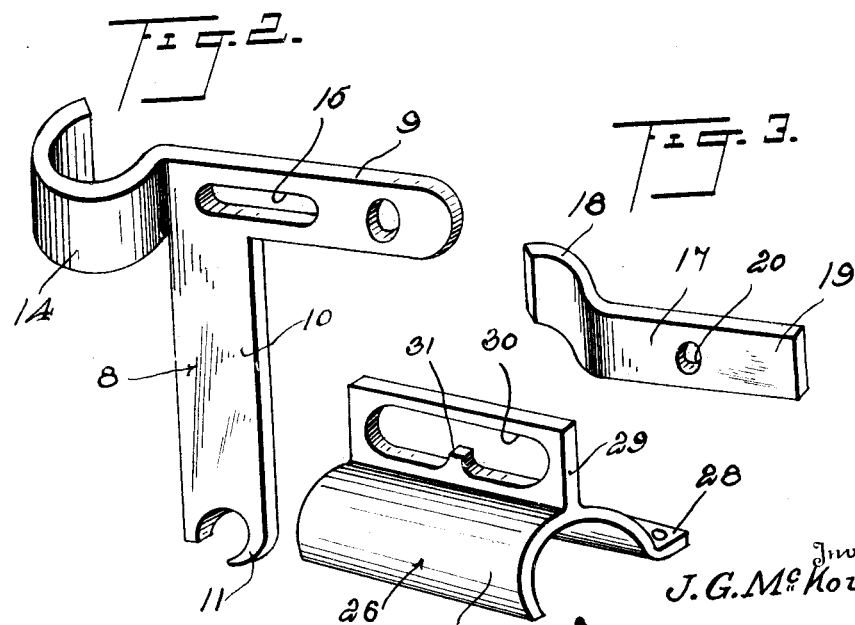

UNITED STATES PATENT OFFICE.

JESSE G. McKOWN, OF SAGUACHE, COLORADO.

SHADE FOR AUTOMOBILE WIND-SHIELDS.

1,176,582.  Specification of Letters Patent. Patented Mar. 21, 1916.

Application filed November 27, 1914. Serial No. 874,264.

*To all whom it may concern:*

Be it known that I, JESSE G. McKOWN, a citizen of the United States, residing at Saguache, in the county of Saguache and State of Colorado, have invented certain new and useful Improvements in Shades for Automobile Wind-Shields; and I do hereby declare the following to be a full, clear and exact description of the invention, such as will enable others skilled in the art to which it appertains to make and use the same.

This invention relates to automobile constructions and the primary object of the invention is to provide a sun shade or awning for attachment to a wind shield for eliminating the glare of the sun upon the wind shield, thereby avoiding many accidents due to the blinding of the driver of the car by the glare of the sun upon the wind shield.

Another object of this invention is to provide a novel form of sun shade which may be held in various raised or lowered positions as is necessary for properly shading the wind shield, and also to provide means for holding the shade taut in any adjusted position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a perspective view of the improved shade showing the same attached to a fragment of a wind shield. Fig. 2 is a detail perspective view of a bracket used for connecting the shade to a wind shield. Fig. 3 is a detail perspective view of a part of a bracket which coacts with the bracket illustrated in Fig. 2, and. Fig. 4 is a detail perspective view of a bracket employed in the construction of the sun shade showing a part of the construction for holding the shade in various adjusted positions.

Referring more particularly to the drawings, 1 designates the frame or rail of an ordinary wind shield, which has vertical side rails 2 and 3 and a horizontal connecting rail or rod 4 which connects the upper ends of the vertical side rails 2 and 3.

The shade construction 5 embodies a substantially U-shaped bar 6 which is constructed of a flat strip of metal and which has adjustably secured to the ends of its leg 7, brackets 8. The brackets 8 are L-shaped in construction, having an arm 9 which is adapted for lying in a horizontal plane and for being secured to the ends of the legs 7 of the U-shaped bar 6. The vertical arm 10 of the bracket 8 extends downwardly from the arm 9 and has hooks 11 formed upon its lower end to which are attached the ends of contracting spiral springs 12. The ends of the spiral springs 12 which are free from connection with the hooks 11 are secured to the legs or arms 7 as is shown at 13 in Fig. 1 of the drawings.

The bracket arms 8 have substantially semi-circular sleeves 14 formed integrally therewith and projecting rearwardly from the rear end of the horizontal arm 9, which sleeves are adapted for engaging the side rails 2 and 3 of the frame 1 of a wind shield. The arms 9 are provided with longitudinally extending slats 15, through which thumb screws 16 extend. The thumb screws 16 are secured in any suitable manner to bars 17, and by tightening the thumb screws the bars 17 are held in proper connection with the arms 9 and upon the opposite sides of the ends of the legs or arms 7 of the U-shaped bar 6. The bars 17 have their ends 18 curved to engage the substantially semi-circular sleeve 14 for forming a substantially complete circle for inclosing the side rails 2 and 3, as is clearly shown in Fig. 1 and by tightening the thumb screws 16, the U-shaped bar 6 may be securely clamped to the side rails 2 and 3. The ends 19 of the bars 17 which are positioned upon the opposite sides of the openings 20, to which openings the thumb screws 16 are attached, lie in abutting engagement with the ends of the legs 7. The U-shaped bar 6 has secured to the apex thereof in any suitable manner, a canvas or fabric curtain 21, which extends upwardly at an angle therefrom and has a plurality of attaching brackets 22 secured to the upper marginal edge thereof. The attaching brackets 22 have circular heads 23 which encompass the top rail 4, and straight portion 24, which are secured to the outer surface of the fabric curtain 21 and to a reinforcing bar 25, which extends along the under surface of the uppermost marginal edge of the shade or curtain.

The shade or curtain 21 has a bracket 26 secured to the upper marginal edge thereof substantially equi-distant of its ends, which bracket embodies a sleeve 27 which is substantially semi-circular in shape and is adapted for engaging the top rail 4. The sleeve 27 has one edge thereof bent tangentially for forming a flange 28 which is secured to the upper marginal edge of the shade or curtain 21 and to the reinforcing bar 25.

A vertical or upstanding plate 29 is formed integrally with the sleeve 27 and has an opening 30 formed therein. A lug 31 is formed integrally with the plate 29 and projects upwardly into the opening 30 and is provided for seating in any one of the various openings 32 which are formed in a strap 33.

The strap 33 is secured to the lower marginal edge of the shade or curtain 21 as is shown at 34 and extends upwardly along the outer surface thereof, having the openings 32 formed therein, in spaced relation to each other along the length of the strap. The strap 33 has an enlarged head 35 formed upon its upper end, which facilitates the gripping of the strap by the finger of a person desiring to pull upon the strap. By pulling upon the strap 33, and placing the lug 31 in various of the openings 32, the curtain or shade 21 may be held in various folded or raised or lowered positions, as is necessary for the proper shading of the wind shield. The contracting spiral springs 12 tend to hold the U-shaped bar 6 downwardly, and hold the curtain 21 rigidly in various adjusted positions, for preventing the curtain 21 from moving upwardly and downwardly at will.

In reducing the invention to practice certain minor features of construction, combination and arrangement of parts may necessitate alterations to which the patentee is entitled provided such alterations are comprehended within the scope of what is claimed.

What is claimed is:—

1. In a device of the character described comprising a U-shaped bar, L-shaped brackets provided with one of their arms detachably secured to each of the ends of said U-shaped bar, springs connected to each of the other arms of said brackets and secured to bar, substantially semi-circular sleeves formed on the brackets and extending rearwardly of the ends of said bars to engage the sides of a wind shield, bars detachably secured to the brackets and having one of their ends bearing upon the ends of the U-shaped bar, said bars provided with their ends curved to conform to the contour of the sides of a wind shield and into an engagement with the ends of said sleeves to detachably secure the U-shaped bar to the wind shield, a curtain secured to the bar and to the top of a wind shield, and means for raising and lowering the U-shaped bar.

2. In a device of the class described comprising a U-shaped bar, means for detachably securing the bar to the sides of a wind shield, a curtain secured to the bar, means for securing the curtain to the top of the wind shield, a sleeve secured to the curtain and mounted on the top of a wind shield, a vertical plate secured to the sleeve and provided with an elongated opening therein, a lug formed on the plate and extending vertically into the opening, a strap secured to the bar and passed through the opening in said plate and provided with an enlarged head on the end thereof to provide a handle, and said strap provided with a plurality of openings to engage said lug to support the bar in certain position.

In testimony whereof I affix my signature in presence of two witnesses.

JESSE G. McKOWN.

Witnesses:
Max Werner,
Dallas Stubbs.